United States Patent
Otto et al.

(10) Patent No.: US 8,241,546 B2
(45) Date of Patent: Aug. 14, 2012

(54) METHOD FOR THE DIRECT AND CONTINUOUS MANUFACTURE OF POLYESTER MOULDED BODIES WITH LOW ACETALDEHYDE CONTENT

(75) Inventors: Brigitta Otto, Milow (DE); Stefan Deiss, Harxheim (DE)

(73) Assignee: Lurgi Zimmer GmbH, Frankfurt (DE)

( * ) Notice: Subject to any disclaimer, the term of this patent is extended or adjusted under 35 U.S.C. 154(b) by 163 days.

(21) Appl. No.: 12/594,516

(22) PCT Filed: Apr. 4, 2008

(86) PCT No.: PCT/EP2008/002699
§ 371 (c)(1),
(2), (4) Date: Feb. 2, 2010

(87) PCT Pub. No.: WO2008/122414
PCT Pub. Date: Oct. 16, 2008

(65) Prior Publication Data
US 2010/0127422 A1    May 27, 2010

(30) Foreign Application Priority Data
Apr. 5, 2007    (DE) .................. 10 2007 016 586

(51) Int. Cl.
*B29C 45/16* (2006.01)
(52) U.S. Cl. .............. 264/255; 264/328.8; 264/537; 264/328.17

(58) Field of Classification Search .............. None
See application file for complete search history.

(56) References Cited

U.S. PATENT DOCUMENTS

| | | | | |
|---|---|---|---|---|
| 3,617,225 A * | 11/1971 | Kuehne et al. | | 422/134 |
| 4,746,477 A | 5/1988 | Wecker et al. | | 264/45.5 |
| 5,055,273 A * | 10/1991 | Wilhelm et al. | | 422/135 |
| 5,656,221 A * | 8/1997 | Schumann et al. | | 264/85 |
| 5,656,719 A * | 8/1997 | Stibal et al. | | 528/491 |
| 6,099,778 A * | 8/2000 | Nelson et al. | | 264/176.1 |
| 6,274,212 B1 * | 8/2001 | Rule et al. | | 428/36.92 |
| 6,559,271 B2 | 5/2003 | Schaaf et al. | | 528/272 |
| 7,547,406 B2 * | 6/2009 | Otto et al. | | 264/328.17 |

FOREIGN PATENT DOCUMENTS

| | | | |
|---|---|---|---|
| CH | 694 291 A5 | | 11/2004 |
| DE | 19505680 | * | 5/1996 |
| DE | 19503053 | * | 8/1996 |
| DE | 100 45 719 A1 | | 4/2002 |
| EP | 0320586 | * | 6/1989 |
| EP | 0842210 | * | 5/1998 |
| EP | 0842211 | * | 5/1998 |
| EP | 0968243 | * | 1/2000 |
| JP | 2007105999 | * | 4/2007 |
| WO | WO 98/41381 | * | 9/1998 |
| WO | WO 2005/061581 | * | 7/2005 |

* cited by examiner

*Primary Examiner* — Edmund H. Lee
(74) *Attorney, Agent, or Firm* — Seed IP Law Group PLLC

(57) ABSTRACT

The invention relates to a continuous method for the direct production of multilayer mold bodies from a highly condensed polyester melt.

10 Claims, 2 Drawing Sheets

Possible layer configuration

Sample 1: 2 layers

A: Outer layer
B or C: Layer in contact with food

Sample 2: 3 layers

B or C: Layer in contact with food
A: Inner layer
B or C: Layer in contact with food

METHOD FOR THE DIRECT AND CONTINUOUS MANUFACTURE OF POLYESTER MOULDED BODIES WITH LOW ACETALDEHYDE CONTENT

The present invention relates to a continuous method for the direct manufacture of at least two-layer moulded bodies from a highly condensed polyester melt.

STATE OF THE ART

The known aromatic polyesters or copolyesters, particularly polyethylene terephthalate and its copolymers with low portions of, for example, isophthalic acid or cyclohexanedimethanol, polybutylene terephthalate, polytrimethylene terephthalate, polyethylene naphthalate and their copolyesters, which serve as the starting material for the manufacture of hollow bodies, are processed into hollow bodies in injection moulding machines after melt polycondensation at a given intrinsic viscosity (I.V.), which lies, for example, for polyethylene terephthalate and its correspondingly low modified copolyesters, in the range between 0.65-0.90 dl/g.

The standard method used until now for the manufacture of PET for use as food packaging, particularly bottles, looks as follows:
  Terephthalic acid or its esters are esterified or transesterified with ethylene glycol in an esterification step, which can consist of one or even more reactors that are connected in series.
  Under a further increase in the temperature and reduction in pressure in the melt, these esters are polycondensed into a PET of average viscosity with IV=0.55-0.65 dl/g and the product is cooled and granulated.
  The melt that exits the end reactor is granulated, as explained in the preceding, and this PET granulate is then brought to a mean viscosity of 0.75-0.85 dl/g in an inert gas in a reactor for solid state polycondensation (SSP) at temperatures from 180-230° C.

The SSP is primarily used for two reasons: In order to obtain sufficient mechanical stability of the finished bottle, the viscosity must be raised above the level customary for polyester in textile applications. Furthermore, the acetaldehyde content in the polyester melt exiting the end reactor must be reduced from approximately 30-70 ppm to <1 ppm after the completion of the solid state polycondensation, in order to interfere as little as possible with the taste of the product that is filled into the finished PET bottle. As a rule, the granulate is designated and sold as an end product. Those processing this granulate are primarily manufacturers with moulding units for manufacturing hollow bodies. Various types of moulding units, such as injection moulding machines and blow moulding machines, are known to the person skilled in the art. Often so-called preforms are manufactured in pre-forming machines working according to the injection moulding method, and then, in a further step at another processor, and as a rule also at another location, polyester bottles are in turn produced from these preforms using a blow moulding method. Other mouldings are also possible for polyester granulate, for example, in machines for film and foil manufacture, with the method presented here according to the invention.

Acetaldehyde (AA) arises as a normal and unavoidable by-product during PET manufacture. Particularly because of the taste, the AA content that migrates into the filling should not exceed 20 µg/l. This is why the acetaldehyde content must be kept correspondingly low in the finished bottle from the start. The proportion can be controlled up to a certain point by the technological conditions of the polycondensation and the subsequent solid state polycondensation. Depending on the preliminary treatment of the polymer melt ("thermal history"), the conditions in the solid state polycondensation and the operation of the pre-forming machine, acetaldehyde forms again during the melting phase of the granulate. In the finished bottle that is to be filled with sweet drinks, the AA level should not exceed 8 ppm, in the bottle to be filled with noncarbonated water, it should not exceed 4 ppm and in the bottle to be filled with carbonated water, it should not exceed 2 ppm.

Because the demand for polyester bottles has also greatly increased in the meantime, the systems for manufacturing preforms have now reached sizes which do make the use of a separate polyester synthesis system exclusively for supplying the preform manufacture appear economically expedient. At the same time, there would be the possibility of conducting the finished polyester melt directly into the pre-forming machines. To absorb seasonal fluctuations in the preform area, it is also useful to produce granulate simultaneously.

This is why there has been no lack of attempts to bypass the very costly and time-consuming steps in the SSP and to reduce the acetaldehyde by means of the addition of additives, in a manner analogous to manufacturing fibre directly from the polycondensation melt.

For example, DE 195 03 053 describes a method in which, in a segment provided with static mixing elements, an inert gas and an AA-reducing low-volatile amide compound are added to the melt exiting the polycondensation reactor and this melt is fed, under vacuum degassing, in the shortest possible time and with the least possible shearing of the melt, to a moulding device for manufacturing preforms.

EP 0 842 210 describes another possibility for avoiding SSP. There the melt polycondensation is carried out to a viscosity of 0.65-0.85 dl/g and the polyester is cooled and granulated, re-melted and then freed of volatile substances such as AA in a suitable device by rinsing with a suitable rinsing agent, with the formation of a large surface area.

EP 0 842 211 proposes a method in which the polycondensation melt is transferred to a degassing extruder with a polymer compression zone, while at the same time, a suitable rinsing agent is added and then removed again, and the melt treated in this way is transferred directly to a moulding device.

U.S. Pat. No. 6,099,778 discloses a method in which a polycondensation melt is transferred directly into a moulding device. The method is tied to the conditions that the catalyst for the polycondensation is free of cobalt, an acetaldehyde-reducing compound is added and the melt, before being fed into the moulding device at a pressure greater than 25 mm Hg, is degassed down to almost normal pressure, whereby the degassing device can, e.g., consist of a degassing extruder or other suitable conventional apparatuses. Primarily named as AA-reducing substances are polyamides, polyesteramides and polyethylene isophthalate.

WO 98/41381 describes an apparatus and a continuous method for manufacturing moulded polyester articles with low AA content from the polycondensation melt without intermediate solidification of the polyester. In this process, the polycondensation melt is mixed under pressure with an inert gas in an extruder and the melt is degassed under vacuum and, in a mixing zone, reacted with an AA-reducing compound, in order immediately afterwards to be fed to the injection moulding unit. In principle, the compounds listed in the previously cited US application are used as the AA-reducing compounds.

EP 0 968 243 describes a similar process. The polycondensation melt there is fed into a mixing device which can consist of a static mixer, a geared pump or an extruder. A stripping agent, such as nitrogen or carbon dioxide, and AA-reducing agents, such as polyamides or polyesteramides, are fed into it. The melt is transferred from this mixing device to a high-speed evaporator via one or more nozzles. There it is degassed under a vacuum of 5-50 mm Hg and fed into a moulding device, whereby AA-reducing agents can be added again.

In a lecture on 25/26 Feb. 2003, Inventa-Fischer introduced a further process for manufacturing preforms directly from the polycondensation melt. According to this, a high-viscosity reactor is built into a line which supplies PET prepolymer and the viscosity is raised to 0.85 dl/g. After this, AA-reduction agents and, optionally, other additives, are fed into the melt and the mixture is transferred to the injection moulding machine via a mixer.

DE 100 45 719 proposes a method in which after the end reactor, part of the polycondensation melt is branched off and AA-reduction agents, such as amides of polycarboxylic acids and polyvalent amines and polyester stabilizers, such as e.g., triethyl phosphate, are added to this partial flow in a double-screw extruder. Gaseous reaction products are removed in the same extruder through a degassing stub. The partial flow is subsequently reunited with the main flow. This method has the advantage that the costly degassing extruder has to be designed for only a partial flow of the polycondensation melt and is correspondingly cheaper. The fundamental necessity of degassing remains, however.

As other possible AA-reducing agents whose use no longer requires SSP, U.S. Pat. No. 6,274,212 proposes compounds that have at least two hydrogen-substituted heteroatoms bound to carbon and that when reacted with AA in polyester form organic compounds that contain at least two heteroatoms in an unbridged 5- or 6-member ring. Anthranilamide is named as one possible compound in this group. These additives can be sprayed on to, e.g., polyester granulate, as a suspension, can be added to the polyester granulate in the form of master batch granulate or can be added to the melt after the granulate has been melted down.

The methods described consequently have the disadvantage that the use of expensive carrier gas for a melt degassing and an additional degassing unit are required, so that consequently the effort for the apparatus is greater and so more expensive and, finally, depending on the time of the addition of the acetaldehyde scavenger additive, renewed AA formation is not prevented in some cases.

A further method for manufacturing preforms for drink bottles is the direct manufacture of preforms from the high viscosity PET melt. This direct method has been described in the patents DE 195 03 053, DE 195 05 680 and WO 2005/061581. To reduce the objectionable process acetaldehyde content, an additive with an AA-reducing effect is added to the main melt flow before its entry into the moulding units.

With the help of static mixing units that are installed in the pipeline, the additive is homogenously distributed in the polymer melt and then the reaction with the vinylester terminal groups of the polyester and/or with the existing acetaldehyde is initiated. The methods described for acetaldehyde reduction lead to a strong reduction of this substance, but also to discolourations that have to be counteracted by the addition of dyes. The water that results as a by-product during the reaction of the polyamidic additives during the reaction with the vinylester terminal groups leads to an unwanted IV reduction. Furthermore, these additives are very expensive and so relevantly increase the production costs.

CH 694291 A5 discloses a method for direct forming of a PET melt into multi-layer foils. In this case, the melt is directly removed from the polycondensation and supplied to the foil nozzle for foil manufacture, without modification in the main flow for the basis layer and mixed with additives in the side flow for the cover layers. This cited document consequently also discloses that additives are necessary for the layers that potentially come into contact with foods or drinks, wherein the customary scavenger compounds already discussed above are used with regard to possible acetaldehyde content.

Common in the state of the art is consequently that either costly finishing steps are needed (degassing, solid state postpolycondensation, etc.) or cost-intensive scavengers must be used for packaging materials to be used in packaging foods and drinks.

OBJECT OF THE PRESENT INVENTION

It would be desirable to specify a method for manufacturing moulded bodies of polyesters that is suitable for manufacturing materials for packaging foods and drinks, whereby in the method, it is at least partially possible to do without the costly finishing steps or cost-intensive additives.

BRIEF DESCRIPTION OF THE PRESENT INVENTION

This object is solved by the method according to Claim 1. Preferred embodiments are found in the dependent claims 2 to 10 and in the following description.

DETAILED DESCRIPTION OF THE INVENTION

Figure 1:
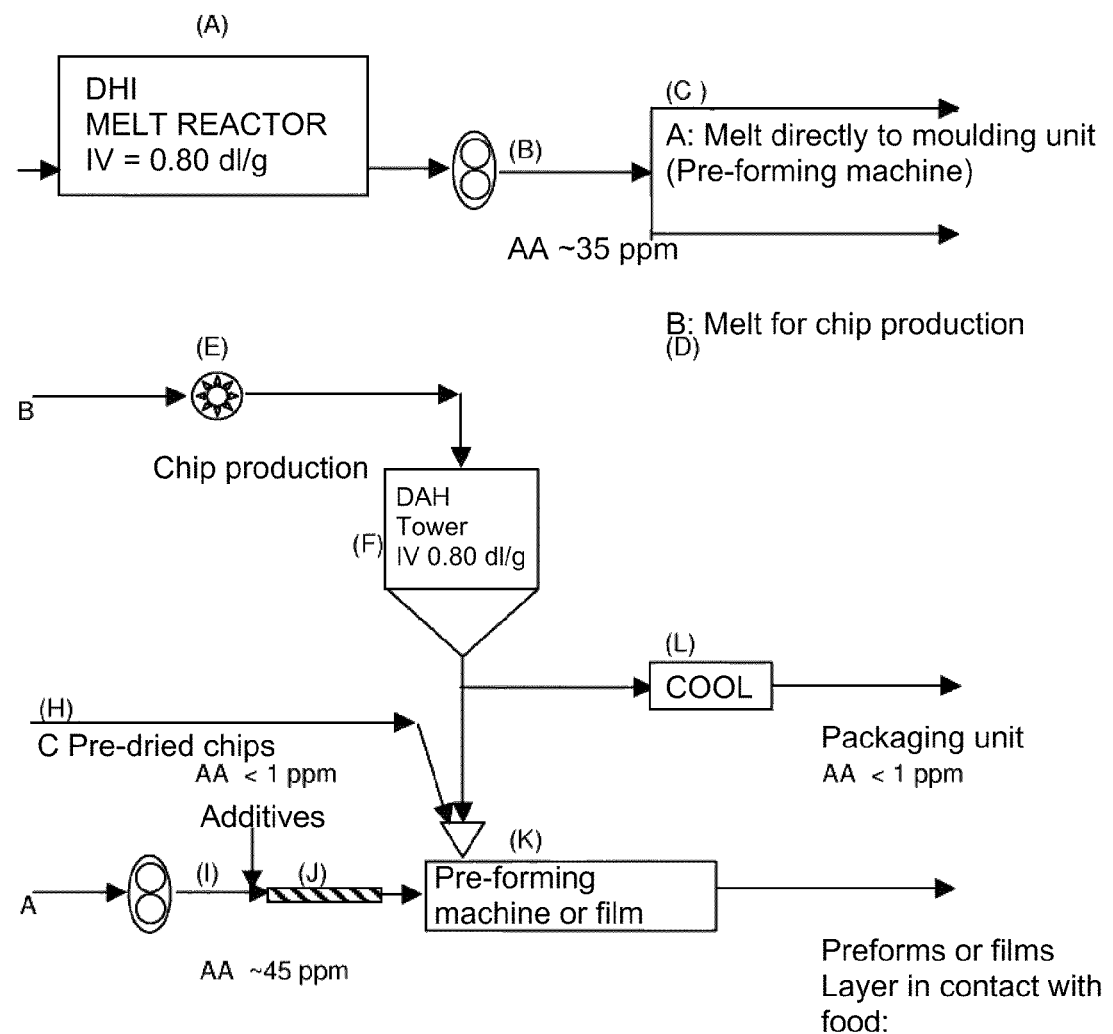
FIG. 1 schematically shows one possible process for the method in accordance with the present invention.

Surprisingly, it was discovered that the abovementioned object can be solved by means of a method for manufacturing multi-layer moulded bodies and packaging films wherein a basis layer is manufactured from a continuously flowing flow of melt with high IV and process aldehyde content added to a direct process and at least one additional layer is obtained by the use of a highly condensed polyester melt with high IV and low acetaldehyde content. The method according to the invention is suitable for manufacturing multi-layer moulded bodies or packaging films of high-viscosity polymers, including aromatic polyesters or copolyesters, obtainable from one or more dicarboxylic acids or their derivatives, such as esters, particularly methylesters, such as terephthalic acid, isophthalic acid, naphthalenedicarboxylic acid and/or 4,4-bisphenyl dicarboxylic acid, and one or more diols, such as ethylene glycol, propylene glycol, 1,4-butanediol, 1,4-cyclohexanedimethanol, neopentyl glycol and/or diethylene glycol.

The method according to the invention is distinguished by the fact that the polyester melt exiting a conventional melt reactor (A), said polyester melt typically having an intrinsic viscosity (IV) of roughly 0.60 to 0.85 dl/g and an acetaldehyde content of 20 to 60 ppm, is divided into two partial flows (C) and (D). The discharge from the melt reactor is typically brought about by means of a discharge pump (B).

The present invention particularly relates to the manufacture of two- or multi-layer moulded bodies, in particular preforms for plastic bottle production (i.e. the preforms from which, in a further processing step, the bottles are formed). In this connection it is preferred, however also for all further embodiments of the present invention, if the intrinsic viscosity is higher than approx. 0.65 dl/g, preferably higher than approx. 0.68 dl/g, and particularly 0.75 dl/g or higher, such as 0.75 dl/g to 0.90 dl/g, particularly 0.80 dl/g to 0.86 dl/g. The preforms mentioned here are preferably produced using a processing device with a pre-forming machine so that in the method according to the invention preferably no foil nozzle is used.

A suitable melt reactor (A) is, for example, a polycondensation reactor for the manufacture of high intrinsic viscosities, such as is described in EP 0320586 A2. In particular, the so-called double-drive reactor (manufacturer: Zimmer AG), which is, for example, described in U.S. Pat. No. 3,617,225, is also suitable.

After the discharge of the polyester melt from the melt reactor, typically by means of a discharge pump (B), the polyester melt is divided into two partial flows by suitable measures. Suitable devices for accomplishing this are known to the person skilled in the art. The partial flow (C) conducts the polyester melt that was obtained directly into the moulding unit, without acetaldehyde scavengers being added to this partial flow, and without degassing or solid state condensation taking place. This partial flow can optionally also only be given other additives in an additive-adding unit (I), for example, UV absorbers, dyes, etc., whereby homogenisation can subsequently take place in a mixing section (J), for example, a mixing section with static mixing elements. This partial flow is then fed directly to the moulding unit (K), in which the polyester melt of the partial flow (C) provides the so-called basis layer.

The partial flow (D) obtained after the melt reactor (A) is fed to a dealdehydisation device, for example, a corresponding tower (F) via a granulating device (E). In this way, chips (also granulate in the following) of polyester are obtained, whereby the original intrinsic viscosity obtained after the melt reactor (A) is essentially retained, but the aldehyde content is reduced to levels preferably less than 5 ppm, more strongly preferably less than 3 ppm, particularly less than 1 ppm. The chips exiting the dealdehydisation unit are subsequently, after being re-melted, fed to the moulding unit (K), so that the minimum of one covering layer with very low acetaldehyde content is obtained from the dealdehydised polyester material. As far as the process is concerned, a slight increase here in the acetaldehyde content in the covering layer cannot be avoided (due to the thermal load, etc.), so that in the minimum of two-layer moulded bodies obtained according to the invention, the covering layer indicated in the preceding will have an acetaldehyde content that is greater than the acetaldehyde content of the starting material for the covering layer, whereby, however, an acetaldehyde content of less than 8 ppm, preferably less than 5 ppm, is still ensured.

According to the invention, the partial flow (D) is subjected to dealdehydisation only, for example in a corresponding tower (F). No additive that serves as an aldehyde scavenger is added to this partial flow (D), however, as is specified, for example, in the patent application CH 694291 A5 discussed at the beginning. In this connection, the present invention provides a simple method for manufacturing a structure with at least two layers. At the same time, at least one covering layer with a low acetaldehyde content results, without it being necessary to use costly aldehyde scavengers that possibly have adverse effects. This covering layer is therefore also particularly suitable for use in areas where the covering layer comes into direct contact with packaged foods and/or drinks, because low acetaldehyde contents are necessary for this. In this connection, it is also not disadvantageous that the basis layer obtained from the partial flow (C) has a higher acetaldehyde content, i.e., normally the process content of acetaldehyde. It has been seen that, contrary to the customary opinion, no acetaldehyde scavengers are needed in the covering layer for catching any migrating or diffusing acetaldehyde from the basis layer. According to the invention, it has been seen that in structures having at least two layers and manufactured in accordance with the method of the present invention, no unwanted increase in the acetaldehyde content occurs in the covering layer, even in the event of longer storage or long-term use. This means that according to the invention, it is possible in the covering layer to do without the use of expensive acetaldehyde scavengers that possibly have adverse effects on the product.

The method according to the invention can be developed in such a way that any excess production of chips can be sorted out by a suitable cooling unit (L), so that this excess production can then be packaged and either stored for use in the system or sold. The method according to the invention also allows the introduction of pre-dried chips made of polyesters with an acetaldehyde content as described in the preceding to be fed via an adding line (H) in order to balance out any production fluctuations.

According to the invention, multi-layer polyester moulded bodies are consequently obtained in a direct and continuous method, whereby these polyester moulded bodies are suitable for packaging foods and drinks and whereby the covering layers that come into contact with the food products or drinks have a very low acetaldehyde content, without it being necessary to use costly scavengers or carry out time-consuming and cost-intensive degassing treatments or solid state condensation.

Figure 2:
FIG. 2 schematically shows the configuration of a multi-layer material obtained by means of the method of the present invention.
Figure 2:
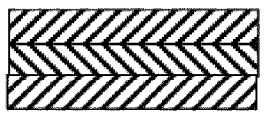

Packaging films or also preforms for drink containers can consequently be obtained in accordance with the invention, whereby it is ensured that the surfaces that come into contact with the foods or drinks have sufficiently low acetaldehyde content. Suitable layer configurations are given in FIG. 2. A two-layer moulded body, for example, a packaging foil, can have an outer layer (A), obtained from the partial flow (C), as well as a covering layer (B), obtained from the partial flow (D). A suitable three-layer configuration comprises an inner layer or basis layer, obtained from the partial flow (C), as well as two covering layers, obtained from the partial flow (D).

A multi-layer moulded body can consequently be manufactured continuously in accordance with the invention, whereby the method comprises both the polycondensation and the moulding. By using the partial flow (C), which does not undergo any dealdehydisation and to which no acetaldehyde scavengers are added, it is possible to produce a basis layer that determines the essentially mechanical characteristics of the moulded body and that makes up the substantial proportion of the weight of the multi-layer moulded body in accordance with the present invention. Only the minimum of one covering layer is produced from the partial flow (D), which underwent dealdehydisation. In this way, it is ensured that the portion of the moulded body that is intended, for example, to come into contact with foods and/or drinks has a sufficiently low acetaldehyde content. At the same time, this minimum of one covering layer makes up only a small portion of the total weight of the moulded body, so that clear cost savings result in this way, because only a small portion of the weight of the total moulded body undergoes costly dealdehydisation. In accordance with the present invention, however, it is nevertheless possible to do without the use of acetaldehyde scavengers, so that in this way there is likewise a further cost advantage. At the same time, this avoids the migration of any residual contents of acetaldehyde scavengers from a covering layer into the food, so that the multi-layer moulded bodies manufactured in accordance with the invention also avoid this potential disadvantage. According to the invention, all possible polyester materials can be used. It is furthermore possible to execute the moulded bodies according to the invention in two layers, three layers or even multiple layers. Only the design with at least two layers, as described in Claim 1, is essential. Additional layers can be produced at the same time as the moulding in the method according to the invention or they can be applied later. Examples are adhesive layers for later application of labels, etc. or other customary layers that are known to the person skilled in the art.

The apparatuses that are to be used according to the invention, such as melt reactor, dealdehydisation tower, mixing segments, moulding equipment, etc., are known in principle to the person skilled in the art.

EXAMPLES

The invention is now explained in more detail using a few by no means restrictive embodiments. The given characteristic values have been determined here as follows:

The analysis methods described in the following were used to describe the product characteristics.

The intrinsic viscosity (I.V.) was measured at 25° C. in a solution of 500 mg polyester in 100 ml of a mixture of phenol and 1,2-dichlorobenzol (3:2 parts by weight).

Measurement of the colour values L and b was carried out according to HUNTER. The polyester chips were first crystallised in the drying cabinet at 135±5° C. for an hour. The colour values were then determined by measuring, in a three-range colour measuring device, the colour of the polyester sample with three photo cells each preceded by a red, green and blue filter (X, Y and Z values). The evaluation was carried out according to HUNTER's formula, in which $$L = 10\sqrt{Y}$$

and $$b = \frac{7.0}{\sqrt{Y(Y - 0.8467Z)}}.$$

The acetaldehyde was driven out by heating in an enclosed polyester container and the acetaldehyde in the gas area of the container was determined by gas chromatography with the head-space injection system H540, Perkin Elmer; carrier gas: nitrogen; column: 1.5 m stainless steel; filling: Poropack Q, 80-100 mesh; sample quantity: 2 g; heating temperature: 150° C.; heating time: 90 min.

To determine the degree of crystallisation KTG, the density ρ of 30 chips is determined three times in a density gradient with a tetrachloroethane/heptane mixture at 23° C. and calculated according to $$KTG = \frac{Pc(P - Pa)}{P(Pc - Pa)}$$

whereby the density of 100% crystalline PET: Pc=1.455 and the density of amorphous PET: Pa=1.332.

The melt enthalpy (heat of fusion; HOF) was determined by heating the PET initial weight in 50-K steps up to 200° C., holding it at this temperature for 5 minutes and then heating it up to 300° C. with 10 K/min; the energy used is determined in kJ/kg.

To determine the acetaldehyde migration, the finished 0.5-l PET bottle was filled with carbonated mineral water and stored 10 days at 40° C. in the thermostat. The content of migrated acetaldehyde in the water that had been filled in was then measured by means of HPLC and specified in µg/l.

The polyethylene terephthalate polymer for the examples was manufactured in accordance with the known state of the art and had the following composition:
Catalyst content Sb: 220 ppm, phosphorous content: 20 ppm, cobalt: 20 ppm, blue dye: 0.5 ppm, IPA: 2.0 mass %, DEG: 1.4 mass %.

Quality of the PET material used to manufacture multi-layer preforms (Table 1):

TABLE 1

|  | Dim. | STD granulate | Granulate D | Melt C |
|---|---|---|---|---|
| IV | dl/g | 0.806 | 0.804 | 0.794 |
| AA | ppm | 0.6 | 0.9 | 26 |
| Colour b (grinding material) | E | 1.1 | 0.9 | 0.8 |
| KTG | % | 59.7 | 43.2 | — |
| HOF | kJ/kg | 58.3 | 34.5 | — |

The melt from line C was fed directly into the moulding unit in channel a at a constant temperature of 270° C., without the further addition of additives.

The melt of line D was processed into approximately round chips with an underwater granulator (E) and very rapidly separated from the water using the connected centrifuge. The dealdehydisation tower (F) was directly loaded with the still hot, already partially crystallised chips (KTG 3%) via a rotary vane feeder. The temperature in the DAH tower was 272° C., the dew point was −22° C. and the air/chip ratio was chosen to be 0.3 to 1. The hot air was conducted in a counterflow. After 9.5 hours of dealdehydisation, the finished granulate was fed directly to the extruder portion of the moulding machine, melted down again at a temperature of 270° C., and brought to channel b. Both of the product flows were then processed into multi-layer preforms in the moulding unit. A modified multi-layer laboratory pre-forming machine was used for these tests. The mono-layer preforms were also manufactured in this pre-forming machine.

The 28-g 3-layer preforms were manufactured in a 2-cavity mould.

The preforms manufactured in this way were then blown into bottles in a 0.5-l form with a petaloid bottom on a pilot bottle blowing machine from Sidel (SBO1). The blowing process was not modified here. The preforms were heated to 106° C. using IR light and then processed at a pressure of 35 bar.

Comparative Example 1

The standard bottle granulate from the European market with an IV of 0.80 dl/g was dried at 160° C. for 5 hours in a Somos dry-air drier to water levels <30 ppm (Karl Fischer method) before being processed in the pre-forming machine.

Comparative Example 2

The bottle granulate D, manufactured according to the DHI method, was conveyed directly to the extruder portion of the pre-forming machine and then processed into mono-layer preforms while still hot (approximately 170° C.) without prior drying.

Comparative Example 3

The melt C from the DHI method was conducted directly into the pre-forming machine without cooling (melt temperature approximately 270° C.) and then injected to mono-layer preforms. The extruder portion of the pre-forming machine here served only the transport and mixing of the melt.

Example 1

The still-hot DHI chips D (see comparative example 2) were melted in the pre-forming machine and lightly charged with the melt C (35%) and processed, with the melt of the melted chips D, into multi-layer preforms in the pre-forming machine. The thickness of the inner layer (basis layer D) was 0.6 mm (10%).

Example 2

Processing as in Example 1, only the thickness of the inner layer (basis layer) was increased to 2.5 mm (25%).

Example 3

Hot DHI chips D (see comparative example 2) were melted in a 2-layer pre-forming machine by Netstal with six cavities and lightly charged with the melt C and processed into two-layer preforms in the pre-forming machine. The thickness of the inner layer was 2.5 mm.

The most important quality parameters are shown in the following Table 2.

TABLE 2

|  | Layer | Colour L/b (grinding material) | AA ppm (grinding material) | AA migration in water [µg/l] |
| --- | --- | --- | --- | --- |
| Comparative example 1 | Monolayer | 92/1.5 | 6.9 | 67 |
| Comparative example 2 | Monolayer | 92/0.2 | 6.8 | 64 |
| Comparative example 3 | Monolayer | 91/0.1 | 37 | 380 |
| Example 1 | 3-layer/ D(0.6)-C-D | 91/0.1 | 22 | 93 |
| Example 2 | 3-layer/ D(2.5)-C-D | 91/0.1 | 19 | 64 |
| Example 3 | 2-layer/ D(2.5)-C | 91/0.1 | 8 | 65 |

The results of the physical requirements on CSD bottles correspond to the market's standard values. In particular, no significant increase in acetaldehyde migration tendencies could be observed.

The invention claimed is:

1. A method of manufacturing moulded bodies having at least two layers, the method comprising:
    discharging a polyester melt from a melt reactor;
    dividing the polyester melt into a first flow portion and a second flow portion;
    introducing the first flow portion into a moulding tool without the addition of acetaldehyde scavengers and without performance of dealdehydisation or solid state condensation;
    subjecting the second flow portion to dealdehydisation, without the addition of aldehyde scavengers, so that an acetaldehyde content of less than 5 ppm is realised;
    introducing the subjected second flow portion into the moulding tool; and
    forming a moulded body such that a first layer of the moulded body is formed from the first flow portion and a second layer of the moulded body is formed from the second flow portion.

2. The method of claim 1, wherein the moulded body has at least three layers.

3. The method of claim 1, wherein the moulded body is a packaging film.

4. The method of claim 1, wherein the moulded body is a preform for bottle manufacture.

5. The method of claim 1, further comprising:
    introducing additives into the first flow portion before the first flow portion is fed into the moulding tool.

6. The method of claim 1, further comprising:
    establishing an operating pressure of up to 200 bar and an operating temperature of up to 320° C.

7. The method of claim 1, further comprising:
    feeding at least twenty-five percent but no more than ninety-five percent of the dealdehydised polymer melt of the second flow portion to a packaging unit via a cooler.

8. The method of claim 1, wherein dividing the polyester melt into the first flow portion and the second flow portion includes feeding at least fifty percent but no more than ninety-five percent of the polyester melt exiting the melt reactor to the second flow portion.

9. The method of claim 1, wherein the second layer of the moulded body constituted by the second flow portion has an acetaldehyde content of less than 8 ppm.

10. The method of claim 1, wherein the first layer of the moulded body constituted by the first flow portion makes up more than 70 wt. % of the moulded body.

* * * * *